United States Patent

Mahy

[11] Patent Number: 5,812,694
[45] Date of Patent: Sep. 22, 1998

[54] COLOR SEPARATION METHOD AND APPARATUS FOR SAME

[75] Inventor: Marc Mahy, Wilsele, Belgium

[73] Assignee: Agfa-Gevaert N.V.

[21] Appl. No.: 697,800

[22] Filed: Aug. 30, 1996

[30] Foreign Application Priority Data

Sep. 15, 1995 [EP] European Pat. Off. .............. 95202499
Jan. 31, 1996 [EP] European Pat. Off. .............. 96200213

[51] Int. Cl.⁶ ....................................................... G06K 9/06
[52] U.S. Cl. ........................... 382/162; 358/518; 358/530; 382/166
[58] Field of Search ................................ 395/98; 382/162, 382/167, 166; 358/504, 518, 530, 520

[56] References Cited

U.S. PATENT DOCUMENTS

| | | | |
|---|---|---|---|
| 4,707,727 | 11/1987 | Penney | 358/10 |
| 5,563,724 | 10/1996 | Boll et al. | 358/502 |
| 5,642,202 | 6/1997 | Williams | 358/406 |

OTHER PUBLICATIONS

H.E.J. Neugebauer; Unsolved Problems of Color Reproduction; Jun. 1958; pp. 45–56.
McManus & Hoffman; A Method for Matching Hardcopy Color to Display Color; 1985; pp. 204–206.
Zeise & Buitano; Device Independent Color Rendition; Apr. 25, 1988; pp. 1–15, 44 & 46.
Spooner; Digital Simulation of Prepress Proofing Systems; (1989); pp. 131–136.
"Digital Simulation of Prepress Proofing Systems", David L. Spooner, SPIE vol. 1184 Neugebauer Memorial Seminar on Color Reproduction (1989), 131–136.
"Device Independent Color Rendition", E.K. Zeise, H.R. Buttano, Apr. 25, 1988.
"A Method for Matching Hardcopy Color to Display Color", Paul McManus, Greg Hoffman, 204 SID 85 Digest, 204–206.

(List continued on next page.)

*Primary Examiner*—Thomas D. Lee
*Assistant Examiner*—Jerome Grant, III
*Attorney, Agent, or Firm*—John A. Merecki

[57] ABSTRACT

A colorant selection mechanism for a color reproduction device is disclosed that is capable to find all the sets of colorants that yield a specific colour and to select the most stable one. In a specific embodiment, the Jacobean of a printer model for the color reproduction device is used to determine a stability number for each colorant combination. The stability number may be based on the largest singular value of the Jacobean. Both the method and an apparatus are disclosed.

11 Claims, 2 Drawing Sheets

OTHER PUBLICATIONS

"Unsolved Problems of Color Reproduction", Technical Association of the Graphic Arts, Tenth Annual Meeting, Jun. 23–26, 1958, H.E.J. Neugebauer, 45–56.

"Evolution of halftoning technology in the United States patent literature", Peter R. Jones, Journal of Electronic Imaging, Jul. 1994, vol. 3(3), 257–275.

"A Survey of Electronic Techniques for Pictorial Image Reproduction", J.C. Stoffel and J.F. Moreland, IEEE Transactions on Communications, vol. COM–29, No. 12, Dec. 1981, 1898–1925.

"On the Rendition of Unprintable Colors", 1987 Proceedings of the Technical Association of The Graphical Arts, James Gordon et al., 186–195.

"Accuracy of Various Types of Neugebauer Model", Robert Rolleston and Raja Balasubramanian, 32–IS&T and SID's Color Imaging Conference: Transforms & Transportability of Color (1993), 625–630.

"Applications of color mixing models to electronic printing", Henry R. Kang 276/Journal of Electronic Imaging/Jul. 1994/vol. 3(3), 276–287.

"Color Correction Technique for Hard Copies by 4–Neighbors Interpolation Method", Katsuhiro Kanamori and Hiroaki Kotera, Journal of Imaging Science and Technology, 1992, 73–80.

"The Black Printer", R. Holub, C. Pearson and W. Kearsley, Journal of Imaging Technology, vol. 15, No. 4, Aug. 1989, 149–158.

"The Colour Sensitivity of a Color Matching Recipe", Boris Sluban and James H. Nobbs, Color Research and Application, vol. 20, No. 4, Aug. 1995, 226–234.

Numerical Recipes in C, The Art of Scientific Computing, William H. Press et al., Cambridge University Press, 59–70.

COLOR SEPARATION METHOD AND APPARATUS FOR SAME

DESCRIPTION

1. Field of the Invention

The present invention relates to devices and methods in the field of image rendering by means of colour reproduction devices.

2. Background of the Invention

The independent values by which a colour device can be addressed are called colorants or inks. For the purpose of generality, the values for these colorants can always be scaled to range from 0 to 100%. A colour reproduction device with n colorants is called a printer or an n-ink process. According to the current invention, the concept of colorant, characterised by a colorant value, is extended to other parameters, characterised by a parameter value, that influence the printed result produced by the colour reproduction device, such as: ambient temperature T, measured in e.g. degrees Celsius; the absolute or relative ambient humidity; the precision of the registration of different colour components or spatial shifts of the colour components with respect to each other; the type of halftoning used, such as frequency modulation halftoning, stochastic screening, halftone dot size modulation or autotypical screening, preferentially as these screening techniques continuously change from one type to another, e.g. as a function of tone value of the original image or the like; type of rosette structure, such as dot centred or clear centred rosette, preferentially varying continuously between two extremes e.g. as described in EP-A-0 680 193, etc. All these extra characteristics of the printing process may be described by one or more variables, representing their value, the change or variation of which may influence the printing process and specifically the colour rendered by the reproduction device, which may result in a different look of the colour reproduction.

For better understanding of the present invention and the prior art, the following definitions and explanations are given.

With colorant space is meant an n-dimensional space with n the number of independent variables with which the printer can be addressed. In the case of an offset printing press, for example, the dimension of the space may correspond to the number of inks of the printer. This dimension may be extended by the number of relevant parameters, introduced by the above described extension of the concept of colorant.

With colour space is meant a space that represents a number of quantities of an object, referred to as colour values or colour components, that characterize its colour. Colour refers to the sensation of the human visual system that enables to distinguish between objects that have the same size and shape. In most practical situations, colours will be represented in a 3-dimensional space such as the CIE XYZ space. However, also other characteristics can be used such as multispectral values based on filters that are not necessarily linearly related to the colour matching functions to represent colour. A typical example is an n-dimensional space of which the axes correspond to densities.

Other coordinate systems exist that are psycho-visually uniform, i.e. the same Euclidean distance in such a system corresponds to the same difference in visual sensation. More information on colour may be found in the book written by G. Wyszecki and W. Stiles, "Color Science: Concepts and Methods, Quantitative Data and Formulae", edited by John Wiley & Sons in 1982. A colour difference may be defined by the Euclidean distance between two colours, given in one of the colour coordinate systems. The coordinate system may be psycho-visually uniform or not. In a psychometric uniform colour space, such as the CIELAB colour space, colour values may be given by the coordinate values L*, a* and b*. Every other non-singular transformation, preferentially linear, isometric and isomorphic such as a coordinate rotation, may constitute three other colour values, suitable for representing a colour in a method according to the current invention.

With colorant gamut or colorant domain is meant the delimited region in colorant space of colorant combinations that are physically realizable by a given printer, taking into account possible extra limitations on colorant combinations. In this invention it is supposed that colorant limitations can always be specified by mathematical formulae that describe the boundaries of the desired colorant gamut.

The colorant gamut of a cmyk offset printing press for example is often delimited by a linear condition that limits the sum of the four colorants cmyk (for example to 340%).

A printer model is a mathematical relation that expresses colour values as a function of colorants for a given printer. The variables of the colorants are denoted as $c_1, c_2, \ldots, c_n$ with n being the dimension of the colorant space.

A printer or n-ink process may be characterized by its colorant gamut with a number of colorant limitations and the printer model. By inverting the printer or the n-ink process is meant that the printer model is inverted. If an n-ink process is given with colorant limitations in the colorant domain and if an m-ink process is deduced from this n-ink process by setting n-m colorants to constant values in the printer model of the n-ink process, the colorant limitations are inherited by this m-ink process if the colorant gamut of the m-ink process is restricted by colorant limitations obtained by setting the n-m colorants in the colorant limitations of the colorant gamut of the n-ink process to their constant values.

Extracting an m-ink process out of an n-ink process with m<n, means that n-m out of the n colorants in the printer model are replaced by a constant value. The colorants of such an m-ink process vary between the minimum and maximum values they can have according to the colorant gamut of the n-ink process and the colorant limitations are not inherited by the m-ink process. The m-ink process is called the extracted m-ink process of the n-ink process.

With colour gamut is meant a delimited region in colour space, containing colours that are physically realizable by a given printer, taking into account possible extra colorant limitations. Typical devices we have in mind are offset or gravure printing presses, thermal dye sublimation processes, thermal wax transfer processes, electrophotographic processes and many other processes. Nevertheless, the invention can also be applied to other colour reproduction devices such as colour displays, colour photography or film recorders.

A typical printer is capable of depositing various amounts of cyan, magenta and yellow colorants. The modulation of these various amounts can be done by altering the concentration of the dye that is deposited onto the substrate or by means of one of the halftoning techniques, an overview of which is found in the article by J. C. Stoffel and J. F. Moreland "A survey of Electronic Techniques for Pictorial Reproduction", IEEE Transactions on Communications, Vol. COM-29, No. 12, December 1981. More and updated information on halftoning is found in the patent literature and a list of recommended patents is found in the article by Peter R. Jones, "Evolution of halftoning technology in the United States patent literature", Journal of Electronic Imaging 3(3), 257–275, July 1994.

The calculation of the correct amounts of colorant for the rendering of colour images on a printer is called the colour separation problem. Most of the colour separation strategies known in the art comprise the following steps:

In a first step, the relation between the amounts of colorants or colorant values and the resulting colours, represented by their colour values, on a printer is characterized. This is done by first printing a set of colorant combinations that spans the dynamic range of the printer and measuring the resulting colours, giving the corresponding colour values. An example of such a set is the ANSI IT8.7/3 form.

In a second step this relation is mathematically modeled, to obtain the printer model. The printer model consists of some form of an analytical expression that predicts colour or colour values for a given combination of colorant values or colorant amounts. A well known mathematical model is the set of "Neugebauer equations".

In a third step the printer model is inverted. This is necessary as the colour separation problem is involved with finding a set of colorant values that renders a given colour and not vice versa. Model inversion is usually done by means of some iterative search strategy, such as the Newton-Raphson iteration.

A difficulty is that many colours that can occur in photographic images are not reproducible at all by a given printer and hence that no physically realizable set of colorants can be found to render these colours. The solution to this problem consists of first converting the "non-reproducible colour" into a "reproducible colour". Up till now there exists no universally accepted strategy to achieve this goal, and the evaluation of any such strategy is therefore necessarily based on aesthetic and therefore subjective judgment. A discussion of strategies to deal with the problem is found in the article by Jim Gordon "On the rendition of unprintable colours", 1987 Proceedings of the Technical Association of the Graphic Arts, pp. 186–195.

Because it will help to understand the problems in the prior art, a few more words of explanation are given on the Neugebauer equations for a 3-ink process.

The Neugebauer Equations for a 3-Ink Process

The printing with three inks and three halftone screens results theoretically in 8 possible combinations of ink overlap. The Neugebauer expressions predict the resulting colour as a linear function of the colours of these combinations. The Neugebauer equation for the X tristimulus value in a 3-ink process is:

$$X(c_1,c_2,c_3)=a_w X_w+a_1 X_1+a_2 X_2+a_3 X_3+a_{23}X_{23}+a_{13}X_{13}+a_{12}X_{12}+a_{123}X_{123}$$

The terms $X_{ijk}$ in the above equation are the X tristimulus values of the corresponding overprints. The Neugebauer expression for the Y and Z tristimulus values are obtained by replacing the X tristimulus values by the corresponding Y and Z values respectively. If it is assumed that the relative positions of the halftone dots is random, the Neugebauer coefficients can be calculated from the Demichel equations that predict the fraction of each combination of the three inks as a function of their respective dot percentages $c_1$, $c_2$ and $c_3$:

$$a_w=(1-c_1)(1-c_2)(1-c_3)$$

$$a_1=(c_1)(1-c_2)(1-c_3)$$

$$a_2=(1-c_1)(c_2)(1-c_3)$$

$$a_3=(1-c_1)(1-c_2)(c_3)$$

$$a_{23}=(1-c_1)(c_2)(c_3)$$

$$a_{13}=(c_1)(1-c_2)(c_3)$$

$$a_{12}=(c_1)(c_2)(1-c_3)$$

$$a_{123}=(c_1)(c_2)(c_3)$$

Substitution of the Demichel equations in the Neugebauer equations and rearranging the terms leads to the following representation of the three Neugebauer equations for a 3-ink process:

$$X=k_0+k_1c_1+k_2c_2+k_3c_3+k_{12}c_1c_2+k_3c_1c_3+k_{23}c_2c_3+k_{123}c_1c_2c_3$$

$$Y=l_0+l_1c_1+l_2c_2+l_3c_3+l_{12}c_1c_2+l_3c_1c_3+l_{23}c_2c_3+l_{123}c_1c_2c_3$$

$$Z=m_0+m_1c_1+m_2c_2+m_3c_3+m_{12}c_1c_2+m_3c_1c_3+m_{23}c_2c_3+m_{123}c_1c_2c_3$$

These equations predict the XYZ tristimulus values as a function of the amounts of the three colorants $c_1$, $c_2$ and $c_3$. The generalization of the Neugebauer process for n inks is straightforward.

Interpretation of the Neugebauer Equations

It is worthwhile to consider a number of different mathematical interpretations of the Neugebauer equations.

According to a first interpretation, the Neugebauer equations can be seen as a set of three (one for X, Y and Z) trilinear interpolation formulas. This becomes immediately clear by looking at the form of the coefficients of the Neugebauer equations. These coefficients result in exact predictions of X, Y and Z for values of $c_1$, $c_2$ and $c_3$ when they are 0 or 100%, and in trilinearly interpolated values for other values. If the Neugebauer equations are used as multilinear interpolation formulas, they can be used to model any colour device in any colour space.

Instead of using coefficients that make the Neugebauer equations exact for 8 colours, it is sometimes desirable to have coefficients that minimize the error (for example in terms of "least mean square") over a large set of colours. In that case a regression technique can be used to obtain the Neugebauer coefficients. The equations in that case have the nature of an "interpolating polynomial" or approximating polynomial".

An interesting observation is that for a given X, Y and Z, each of the three Neugebauer equations represents a "surface" in the 3-dimensional $c_1$, $c_2$, $c_3$ space. As FIG. 1 shows, the solution of the Neugebauer equations for a given X, Y and Z value can be seen as the intersection between the three surfaces that correspond to these values. In the example of FIG. 1, a cmy process is presented. The axis pointing to the right corresponds to yellow (y), the axis pointing to the left corresponds to magenta (m) and the third axis pointing upwards is cyan (c).

Improving the Precision of the Neugebauer Equations

Real printing processes seldom behave exactly according to the physical model on which the Neugebauer equations are based, and this explains the deviations that can occur between the predicted and measured colour for a given colorant combination.

The interpretation of the Neugebauer equations as an interpolating polynomial leads to the introduction of additional higher order terms to improve their precision. In theory it is possible to increase the number of terms until any desired precision (in terms of "least mean square error") is obtained, but practical arguments—such as numerical stability and the amount of computation needed for the calculation of large sets of coefficients from large sets of data—put constraints on the achievable precision.

An alternative approach, and this is our preferred one, is to "localize" the coefficients of the Neugebauer printer model, and this leads to a "piece-wise" interpolation or approximation approach known under the name of the localized or cellular Neugebauer equations (LNE). The different subdomains are called the Neugebauer cells. In FIG. 2 the colorant domain or cube of a cmy process is presented. The domain is divided into eight Neugebauer cells. Per Neugebauer cell, the printer is modeled by a 3-ink Neugebauer process.

Various other modifications of the Neugebauer model have also been suggested to improve its precision, among which the n-modified and the spectral Neugebauer equations are cited. These and other models are discussed in the overview article by R. Rolleston and R. Balasubramanian "Accuracy of various Types of Neugebauer Model", presented at the 1993 IS&T and SID's Color Imaging Conference on Transformation & Transportability of Color; and in the article by Kang H. R., "Applications of color mixing models to electronic printing", Journal of Electronic Imaging 3(3), July 1994.

Calculation of Separation Look Up Tables

The separation of a colour into a set of colorant values by means of any of the above techniques is a computationally intensive task. When a huge number of colours is to be separated, as is the case for the separation of high resolution images, look up tables and interpolation techniques may be used. The look up tables preferentially have a 3-dimensional address space of which the axes are related to the colour coordinates of the image. With every addressable position in the table corresponds a set of colorant values that are calculated off line by means of one of the above strategies. More information on the use of look up tables for this purpose is found in the patents U.S. Pat. No. 3,893,166, U.S. Pat. No. 4,334,240, U.S. Pat. No. 4,751,535, EP 0,550,212 and DE 42 34 985, and in the article by Kanamori "Color Correction Technique for Hard Copies by 4-Neighbors Interpolation Method", Journal of Imaging Science and Technology, Vol. 36, No. 1, January/February.

GCR Strategies

In general there may be a plurality of sets of colorant values by which a given colour can be obtained. In the case of a 4-ink process for example, there will be a path in colorant space for which all sets of colorant values or all colorant combinations on such a path result in the same colour. However, only one colorant combination, is needed for the look up table. For a cmyk process, this choice is called the GCR strategy. Different criteria can be used to choose the colorant combination as presented in the publication "The black printer", Journal of Imaging Technology, Vol. 15, No. 4, pp. 149–158, 1989 by R. Holub. C. Pearson and W. Kearsley. One example is to choose the colorant combination with the minimum or maximum amount for a given colorant, referred to as the minimum or maximum colorant solution.

According to the current invention the term GCR strategy is used to indicate the criteria to choose one colorant combination out of a plurality of colorant combinations by which a given colour can be reached, and this term GCR is extended for an n-ink process having other colorants than the classical cmyk process and even having another number of colorants.

The minimum or maximum colorant solution is not necessarily the best colorant choice. Due to "variations" or "incremental changes" of a number of printer parameters, the printed colour may deviate from the desired colour. There is no reason that these GCR strategies are the most insensitive for these variations. The combination for which the corresponding colour is least affected by variation of a given number of printer parameters, such as colorant values in the sense of amounts of ink and environmental parameters or parameters dependent on the imaging technology, such combination is called the most stable colorant solution.

In the article "The Colour Sensitivity of a Colour Matching Recipe" by Boris Sluban and James H. Nobbs, published in COLOR research and application, Vol. 20, Nr. 4, pp. 226–234, 1995, the choice of a colour matching recipe is presented in such a way that the colour change by a unit colorant change is minimum. In this publication, the stability is calculated for a limited number of colorant combinations, apparently randomly chosen. These colorant combinations are obtained for different sets of colorants by inverting a colour mixing model using an iterative method. Because the authors of the above article do not describe how to find all different colorant combinations of a colour mixing process with the same colorants, they do not suggest how to find the most stable colorant combination of that process. At page 230, lines 44–46, the authors state that "It is not possible to generalize from this single example and suggest which, if any, strategy produces the most or the least sensitive recipe". There is thus clearly a need for finding the most stable set of colorant values among a plurality of possible solutions.

OBJECTS OF THE INVENTION

It is an object of the invention to find the most stable colorant combination, related to a number of variations of printer parameters, for an n-ink process to obtain a given colour.

It is an object of the invention to find a well-defined "measure of stability" or "stability number", related to a number of process variations to determine the most stable colorant combination.

It is an object of the invention that the previous mentioned measure of stability can be based on a number of colour measurements of printed colours for different variations of the printer parameters.

It is an object of the invention that the previous mentioned measure of stability can be based on a mathematical model, describing the effect of the considered printer parameters.

It is an object of the invention that the most stable colorant combination may be changed to meet some other properties of separation look up tables, such as continuity and monotonicity of the separations of colour degrades.

It is an object of the invention that the GCR choice or parameters of a GCR choice are driven by determining local or global stability measures.

Further objects and advantages of the invention will become apparent from the description hereinafter.

SUMMARY OF THE INVENTION

The above mentioned objects are realised by the specific features according to claim 1. Preferred embodiments of the invention are disclosed in the dependent claims.

As discussed above, colorant values not only comprise the values in order to increase or decrease the amount of ink deposited by the output device, but also environmental parameters such as temperature, relative or absolute humidity, screening parameters and parameters indicative for geometrical registration, screening type such as autotypic screening, stochastic screening, rosette structures etc. The printer model may be based on Neugebauer equations or other transformations. In a three-ink process, one set of colorant values comprises at least three colorant values, one for each ink, apart from environmental and other relevant parameters, preferentially varying continuously.

A stability number is a value that corresponds with and may be computed from just one set of colorant values. Once the method for computing a stability number is established, then for each different set of colorant values, one stability number may be derived or computed. Whereas the printer model gives colour values as a function of colorant values, a stability number may be computed from a function (f) that evaluates colour changes (ΔColour) from colorant variations (ΔColorant), where these colour changes are caused by these variations of colorant values, variations about a given set of colorant values (Colorant).

Mathematically this may be expressed as $$\Delta Colour = f(\Delta Colorant)|_{Colorant}$$

In the most essential form, ΔColour may be established by the following steps:

- print a first colour by driving the colour reproduction device by colorant values given by "Colorant";
- measure the first printed colour, e.g. by a colour densitometer, a photospectrometer etc., resulting in a measurement value "$Colour_1$";
- print a second colour by driving the same colour reproduction device by colorant values, given by "Colorant" plus a small variation ΔColorant;
- measure the second printed colour, preferentially by the same device by which the first printed colour was measured, resulting in a second measurement value "$Colour_2$"; and,
- compute ΔColour from: $\Delta Colour = Colour_2 - Colour_1$ For example, to measure the influence of ambient temperature variation, the colour reproduction device may print a first set of colour patches, e.g. ANSI IT8.7/3 form, at ambient temperature $T_1$ and then print a second set of patches, printed under the same circumstances, e.g. the same ANSI form, except for the ambient temperature, which is now $T_2$. The colour difference between the first and second corresponding patches is measured, and the colour change as a function of temperature variation can be modelled for a colorant gamut enveloping the colour patches.

In a preferred embodiment, the function f( ) may be derived from a printer model p( ), preferably by computing the total differential of the printer model p( ), such that f( ) is the Jacobean of p( ).

With each set of colorant values, preferably one stability number is associated.

In order to select an optimum colorant set from a wide colorant gamut, a colorant is selected as parameter and samples are established for that colorant. These samples may be equidistant. preferentially sampled between a minimum and maximum colorant value. For each sampled colorant value, the printer model is preferentially inverted, in order to compute other colorant values, which are required to obtain the given colour once the sampled colorant value is fixed. For example, where the colorants are cyan, magenta, yellow and black, the black colorant may be selected as parameter and the colorant value for black may be fixed to several "sampled" values. For each fixed value, the colorant values for cyan, magenta and yellow are computed in order to achieve the given colour, printed together with the fixed amount of black. As is described in the European patent application filed under number 95 20 2499.0 on Sep. 15th 1995, more than one solution may be found for the cyan, magenta and yellow colorants, by inversion of a printer model.

Preferentially one suitable solution is selected. Several colorant values for the black colorant may be sampled, each giving a set of cyan, magenta and yellow colorant values, such that the complete set of colorant values for cyan, magenta, yellow and black, results in the given colour. Preferentially for each complete set of colorant values thus obtained, a stability number is computed. Stability numbers corresponding to different sets may be combined, e.g. simply added, in order to give a stability index. A stability index may also correspond to one stability number. A set of colorant values that optimizes the thus obtained stability index is selected for reproducing the given colour.

In this invention colours are separated in colorants taking into account different colorant values that may influence the resulting colour. The colorants are preferentially chosen in such a way that the colour change for each individual colour or for a series of colours is as small as possible for changes or variations of the parameters. In this way the most stable colour reproduction will be obtained.

To determine the most stable colorant combination, a stability measure or stability number has been defined, giving a low stability number for the highest stability or lowest colour variation. This measure may be based on a model that characterizes the behaviour of the printer for the different parameters or on a number of colour measurements so that influences of the printer parameters can be estimated. Different methods to determine stability measures are presented below.

To choose the most stable colorant combination for obtaining a given colour, the n-ink process is inverted and per solution the stability is assessed. The solution with the smallest stability number is retained. For a 3-ink process there are only a fixed number of discrete solutions, but for an n-ink process with n>3, there is a continuum in colorant space that maps to the same given colour. In a preferred embodiment n−3 colorants are selected as "parameter" and sampled each time by fixing n−3 colorant values. An extracted 3-ink process is determined from the n-ink process by setting the n−3 inks to their sampled colorant value and the extracted 3-ink process is inverted. Per solution the stability number is calculated. This is done for all the sampled values of the n−3 colorants and the colorant combination with the smallest stability number is retained. In another embodiment, stability numbers corresponding to different colours, but to identical sampled colorant values, are added in order to obtain a stability index, also referred to as a global stability measure.

Apart from choosing the most stable colorant combination per colour, other GCR strategies may be used of which the parameters are driven by local or global stability measures.

DETAILED DESCRIPTION OF THE INVENTION

Figure 1:
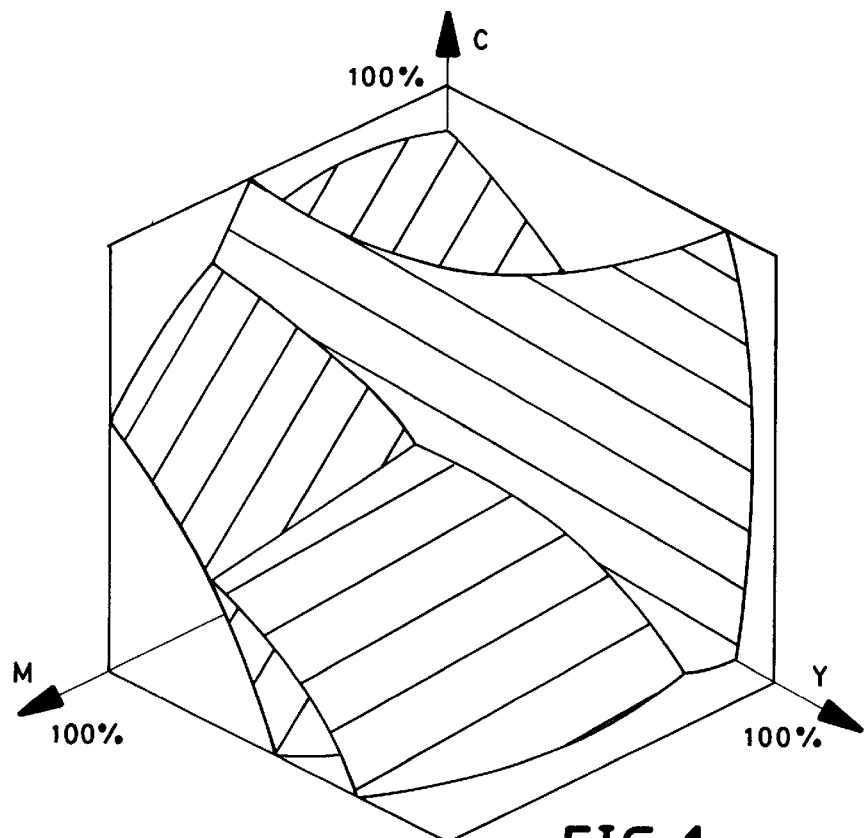
Figure 2:
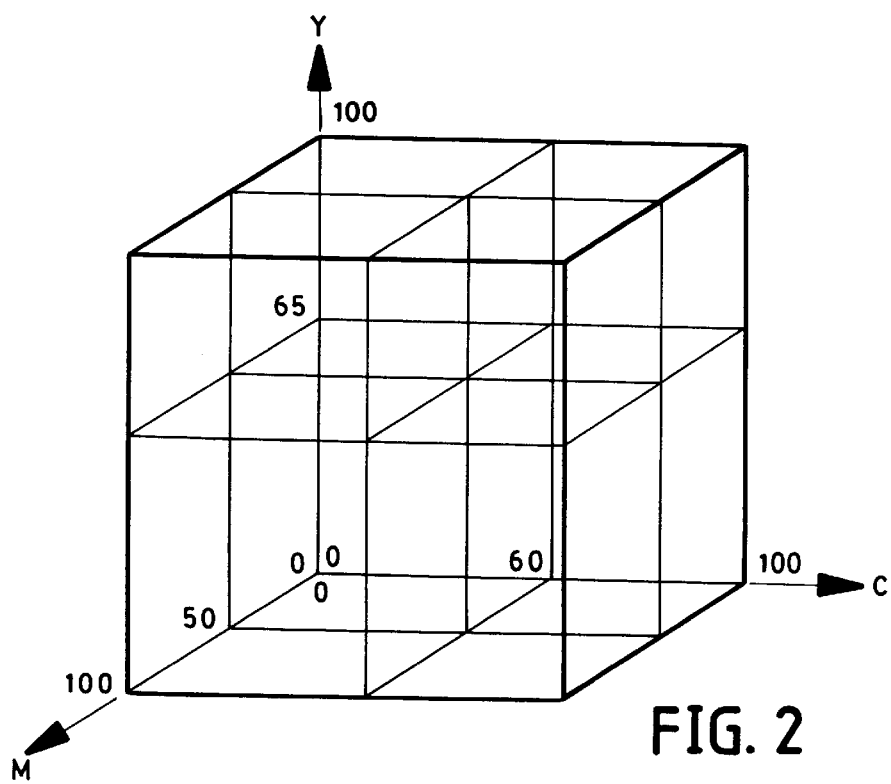
Figure 3:
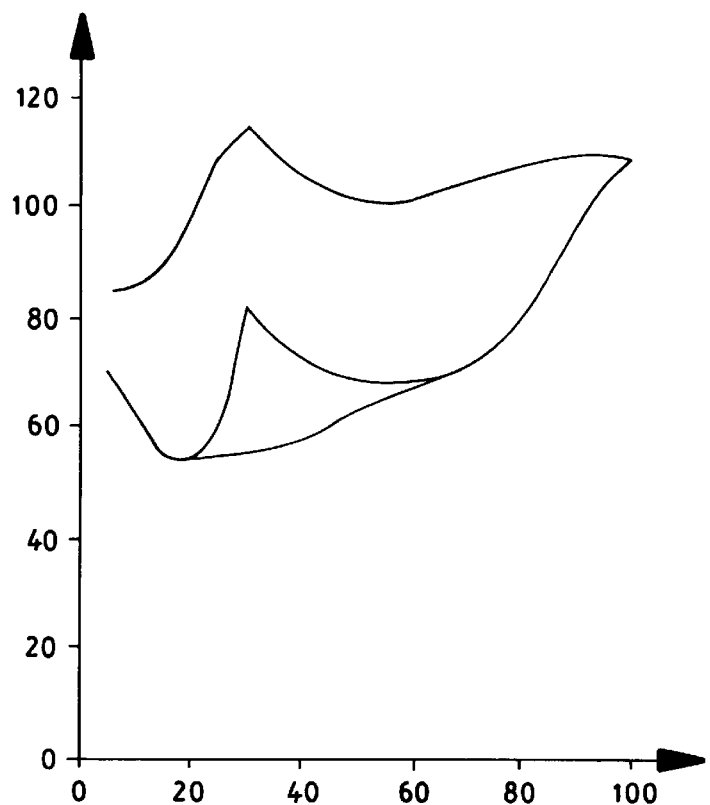
Figure 4:
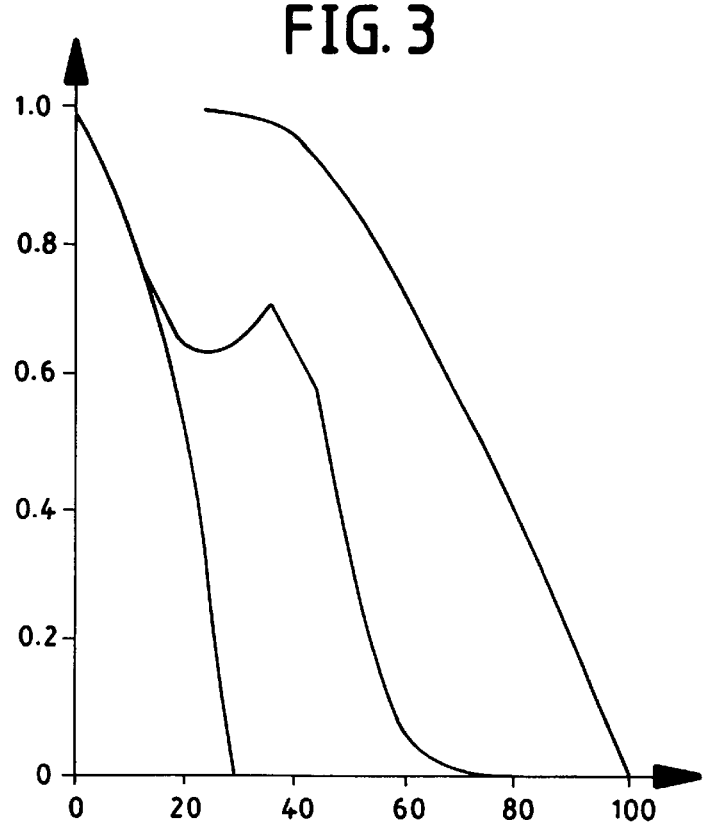

The invention is described hereinafter by way of examples with reference to the accompanying figure wherein:

FIG. 1: shows the solution of the Neugebauer equations for a given X, Y and Z value as the intersection between three surfaces that correspond to these values;

FIG. 2: shows the division of a colorant cube of a CMY process in eight Neugebauer cells;

FIG. 3 shows three curves, each representing a stability number as a function of the lightness value and each according to a different GCR strategy in a cmyk offset printing process, the stability number being based on the largest singular value of the Jacobean of a printer model of the cmyk offset printing process;

FIG. 4: shows dot percentages for the black colorant as a function of grey values, each curve according to a different GCR strategy of the cmyk offset printing process according to FIG. 3.

While the present invention will hereinafter be described in connection with preferred embodiments thereof, it will be understood that it is not intended to limit the invention to those embodiments. On the contrary, it is intended to cover all alternatives, modifications, and equivalents as may be included within the spirit and scope of the invention as defined by the appending claims.

In the above mentioned European patent application, filed under number EP 95202499.0 on Sep. 15, 1995, a robust inversion method is presented. With this technique all colorant combinations can be found by which a given colour can be obtained. The most stable colorant combination can be selected by making use of a stability measure.

Introduction

In this section some stability measures are defined, based on a stability model as well as on colour measurements. By making use of these measures, colorant combinations are selected to reproduce colours. The stability measures can be used to select the colorant combinations per colour or a more global stability measure can be used to choose the parameters of other GCR strategies.

Stability Measure

A measure is needed that reflects the stability of the printed colour related to the variation of a number of printer parameters such as a change in dot percentage, registration error and changes in thickness of the colorant layers. The variation or change of the printer parameters can be simulated on printers and modeled. In this way a model will be obtained that expresses a change of colour as a function of a variation of the printer parameters. This model is referred to as the stability model, expressing the colour reproduction stability for a plurality of sets of colorant values.

In general a printer model is needed to separate colours in colorant values. In a preferred embodiment, the model to determine the stability of colours can be based on the printer model. In the particular example that follows, only changes in colorant values are taken into account, and registration errors for example will not be included in the stability measure or stability number based on a printer model.

In the next paragraphs, only printer models will be used to determine colour stability, but the proposed methods can easily be extended for printer models—giving colour as a function of colorants—as well.

A printer model relates colour to colorant values. To determine the effect of colorant variations on colour changes, the Jacobean of the printer model can be used. If the printer model is given by:

$$X = F_1(c_1, c_2, \ldots, c_n)$$
$$Y = F_2(c_1, c_2, \ldots, c_n)$$
$$Z = F_3(c_1, c_2, \ldots, c_n)$$

then the Jacobean corresponds to the 3Xn matrix in the following expression:

$$\begin{pmatrix} \partial X \\ \partial Y \\ \partial Z \end{pmatrix} = \begin{pmatrix} \partial F_1/\partial c_1 & \partial F_1/\partial c_2 & \ldots & \partial F_1/\partial c_n \\ \partial F_2/\partial c_1 & \partial F_2/\partial c_2 & \ldots & \partial F_2/\partial c_n \\ \partial F_3/\partial c_1 & \partial F_3/\partial c_2 & \ldots & \partial F_3/\partial c_n \end{pmatrix} \begin{pmatrix} \partial c_1 \\ . \\ . \\ . \\ \partial c_n \end{pmatrix}$$

This relation expresses the change in colour due to a variation in colorants. In the example of a four colour CMYK process, the change of colour as a function of a change in colorant values may thus be obtained by evaluating the "Jacobean". On this Jacobean, a singular value decomposition algorithm can be applied. Three singular values are obtained. They express the change in colour according to three perpendicular directions in colorant space. An example of an algorithm that performs this operation may be found in the book "Numerical Recipes in C, The Art of Scientific Computing", second edition, written by Press William H., Teukolsky Saul A., Vetterling William T. and Flannery Brian P., edited by Cambridge University Press under number ISBN 0 521 43108-5, at pages 59–70. For the current example, this algorithm computes four orthogonal directions in the colorant space, of which three correspond to the largest, an intermediate and the smallest change of colour in the XYZ colour space, and of which the fourth direction causes no colour change at all in this point of the XYZ colour space. It is this largest colour change that has to be minimized, and hence provides a useful stability measure or number. The largest singular value thus corresponds to the largest change in colour for a unit change of the colorants for any direction in colorant space. The second largest singular value is the largest change in colour for a unit change in colorants in a direction in a plane perpendicular to the direction related to the first singular value. The smallest singular value corresponds to the smallest colour change for a unit change of colorants.

Several stability measures can be defined by making use of singular values. The measure can be based on the combination of all the three singular values such as the sum of squared values, the vector sum or the average radius of an ellipsoid with the size of the main axes equal to the singular values. Another choice would be to take the largest singular value. In that case the stability measure is equal to the largest possible colour change for a unit change in colorants.

In the previous example colours are represented in the CIE XYZ colour space and the singular values correspond to Euclidean differences in XYZ. To relate colour differences with visual differences, colour differences may be determined in uniform colour spaces such as CIELAB. Therefore better results can be obtained with printer models that describe colours in for example CIELAB instead of XYZ.

With this method it is also possible to print certain characteristics of colours as stable as possible. If for example the lightness value should be printed accurately, that colorant combination could be determined for which the change in lightness is as small as possible. This may be done for example for 4 colorants as follows:

$$L^* = F(c_1, c_2, c_3, c_4)$$

and hence the Jacobean becomes:

$$(\partial L^*) = (\partial F/\partial c_1 \; \partial F/\partial c_2 \; \partial F/\partial c_3 \; \partial F/\partial c_4) \begin{pmatrix} \partial c_1 \\ \partial c_2 \\ \partial c_3 \\ \partial c_4 \end{pmatrix}$$

According to this "minimal lightness change" example, there will be one singular value, that can be used as stability measure. The singular value corresponds to the largest lightness change for a unit change in colorant space.

If the chroma components for example should be as accurately as possible, only the a* and b* expressions of the printer model in CIELAB could be taken into account.

Another way to define stability can be obtained by evaluating colour changes for a number of changes of colorant values and taking for example the largest colour change as stability measure. In fact if a lot of colorant changes are taken, lying on a sphere around a given colorant combination, the previous method corresponds to the stability measure that is equal to the largest singular value. In this case it is not necessary to use an analytic stability model.

It is clear that there are many more possibilities to define colour stability and that all of them fall under the scope and the spirit of this invention.

Choice of the Stability Model

The stability model characterizes the influence of different printer parameters on the reproduced colour. If only changes of the colorants are taken into account, the printer model could be used. However, in some cases a different printer model should be employed. If the stability measure is defined on the Singular Value Decomposition (SVD) of the Jacobean, the first derivatives of the printer model should be continuous functions. The localized Neugebauer model for example is continuous at the boundaries of the Neugebauer cells but not its first derivatives. This would lead to discontinuous values for the stability measure and as a result discontinuous and non-monotone separations. Therefore other models such as polynomials are preferred as printer model to define the stability measure.

Inversion of the Printer Model for the Most Stable Colorant Combination

As printer model in a preferred embodiment, a set of equations may be used, of which all the solutions can be found. In the European patent application number 95202499.0 filed on Sep. 15, 1995, it is indicated that for the Neugebauer model and the localized Neugebauer model a robust inversion technique exists with which all the different solutions can be determined. Basically, a set of Neugebauer equations in three variables is converted to a sixth order polynomial in one variable. The six roots of this polynomial are found and checked for validity. One or more discrete roots out of six may be selected, based on a specific criterion.

For a 3-ink process, there will be a fixed number of discrete solutions with which a given colour can be obtained. For each such solution, preferably the stability is determined according to the current invention and the most stable colorant combination is retained.

For a 4-ink process there will be a number of paths in colorant space for which all colorant combinations on such path map to the same colour. In this case, one colorant is selected and each value for this one colorant is sampled between two values thereby establishing a 3-ink process. The two values may be between 0% and 100% or, in order to reduce computational effort, between the minimum and maximum colorant value by which the given colour can be reached. An extracted 3-ink process is determined from the 4-ink process by setting the colorant to its sampled value. For each solution of the extracted 3-ink process inside the colorant domain, the stability is calculated. This procedure is repeated for all the sampled values of the colorant and the colorant combination with the smallest in stability is retained.

For an n-ink process, n−3 colorant values will be sampled between for example 0 and 100%. The extracted 3-ink process is determined from the n-ink process with setting the n−3 colorants to their sampled values. The extracted 3-ink process is inverted and for each solution inside the colorant domain the stability number is calculated. This procedure is repeated for all the sampling values of the n−3 colorants and the colorant combination with the smallest stability is retained.

In FIG. 3 the stability number or measure is represented in ordinate for separations of grey values according to three different GCR strategies of a cmyk offset printing process. The stability measure corresponds to the largest singular value of the Jacobean of a printer model, i.e. a polynomial in CIELAB. The horizontal axis corresponds to lightness value or grey value, the vertical axis represents the colour change in CIELAB for a 100% colorant change. Such colour change is representative for the stability measure. The lowest curve represents the stability of the most stable colorant solution, the highest curve with the most unstable colorant solution (stability=lowest maximum singular value). The maximum black solution for this printer model happens to coincide with the most unstable colorant solution. The curve in between corresponds to the minimum black solution. Here we see that for this process some colours can be reproduced about twice as stable as for the maximum black solution.

In FIG. 4 the dot percentages for the black colorant are represented in ordinate for grey values in abscissa according to the three different GCR strategies of the cmyk offset printing process discussed in FIG. 3. The lowest (respectively highest) curve corresponds to the minimum (respectively maximum) black solution. As said before, the most unstable colorant solution coincides with the maximum black solution. The curve in between represents the optimum dot percentages of black for the most stable colorant solution. The horizontal axis corresponds to lightness value, the vertical axis represents the dot percentage for black (0=0%, 1=100%).

Inversion of the Printer Model for GCR Strategies Driven by Local or Global Stability The main problem with choosing the most stable colorant combination is that separations are not necessarily monotone. If for example monotonicity and continuity are the main requirements for colorant separations, colours are preferably separated according to these criteria but the parameters of the GCR strategy may be determined by making use of stability measures.

These stability measures may either be based on the previous defined stability measure for each colour or another measure can be used that represents the stability based on the printing of a number of colours.

A typical example is the determination of the GCR percentage between minimum and maximum black. Different separations can be made for different GCR percentages and per separation table the total sum of the stability measures over all colours is calculated. The table with the smallest sum will be the optimum GCR percentage. In this case a global stability measure is employed. Another method for example would be to determine different GCR percentages for colours lying in different lightness planes. The chosen GCR percentage corresponds to that value for which the sum of the stability values of colours in a given lightness plane is minimum. Here a more local stability measure is used.

Having described in detail preferred embodiments of the current invention, it will now be apparent to those skilled in the art that numerous modifications can be made therein without departing from the scope of the invention as defined in the following claims.

I claim:

1. A colour reproduction process, wherein a given colour is reproduced by a colour reproduction device from a set of colorant values, being established by steps comprising characterizing said colour reproduction device by a printer model for transforming a set of colorant values to a set of colour values, descriptive for a colour;

establishing a stability number for assessing colour reproduction stability of a set of colorant values;

selecting at least one colorant as parameter;

obtaining one or a plurality of sampled colorant values by sampling said selected colorant;

for each sampled colorant value, establishing at least one set of colorant values corresponding to said given colour, by determining via said printer model at least one colorant value for a colorant not selected as parameter; and, selecting from all established sets of colorant values, corresponding to said given colour, a set of colorant values having a minimum or maximum stability index, based on at least one said stability number.

2. Method according to claim 1, wherein said printer model is based on Neugebauer equations or localized Neugebauer equations.

3. Method according to claim 1, further comprising the steps of:

determining said stability number from the largest change of at least one colour value for a fixed variation of at least one colorant value; and, optimizing said stability index by minimizing it.

4. Method according to claim 1, wherein said stability number assesses for a set of colorant values a change of at least one colour value, caused by a variation of at least one colorant value.

5. Method according to claim 4, wherein the step of optimizing said stability index comprises the step of selecting the set of colorant values having accorded the smallest change of said given colour whenever a small variation of at least one colorant value is given.

6. Method according to claim 4, wherein said change is evaluated in a psychometric uniform colour space.

7. Method according to claim 1, wherein said stability number is based on at least one singular value from the Jacobean of a second printer model.

8. Method according to claim 7, wherein said second printer model is continuous for its first derivatives.

9. Method according to claim 1, further comprising the steps of:

establishing a minimum and maximum colorant value for each selected colorant; and, obtaining each sampled colorant value by sampling within a range between said minimum and maximum colorant value.

10. Method according to claim 9, wherein:

said minimum colorant value corresponds to the minimum colorant value, that is suitable for obtaining said given colour; and, said maximum colorant value corresponds to the maximum colorant value, that is suitable for obtaining said given colour.

11. A colour reproduction device, for reproducing a given colour from a set colorant values, comprising:

means for characterizing said colour reproduction device by a printer model for transforming a set of colorant values to a set of colour values, descriptive for a colour;

means for establishing a stability number for assessing colour reproduction stability of a set of colorant values;

means for selecting at least one colorant as parameter;

means for obtaining one or a plurality of sampled colorant values by sampling said selected colorant;

means for establishing, for each sampled colorant value, at least one set of colorant values corresponding to said given colour, by determining via said printer model at least one colorant value for a colorant not selected as parameter; and, means for selecting from all established sets of colorant values, corresponding to said given colour, a set of colorant values having a minimum or maximum stability index, based on at least one said stability number.

* * * * *